(12) United States Patent
Subramanyan

(10) Patent No.: US 8,486,944 B2
(45) Date of Patent: Jul. 16, 2013

(54) PRODUCT TO BOOST PHOTOSYNTHESIS

(75) Inventor: Sundaresan Subramanyan, Chennai (IN)

(73) Assignee: Sree Ramcides Chemicals Pvt Ltd., Chennai (IN)

( * ) Notice: Subject to any disclaimer, the term of this patent is extended or adjusted under 35 U.S.C. 154(b) by 240 days.

(21) Appl. No.: 12/866,795

(22) PCT Filed: Aug. 21, 2008

(86) PCT No.: PCT/IN2008/000520
§ 371 (c)(1),
(2), (4) Date: Aug. 9, 2010

(87) PCT Pub. No.: WO2009/098709
PCT Pub. Date: Aug. 13, 2009

(65) Prior Publication Data
US 2011/0009270 A1    Jan. 13, 2011

(30) Foreign Application Priority Data
Feb. 8, 2008    (IN) .............................. 331/CHE/2008

(51) Int. Cl.
*C05C 13/00*    (2006.01)
*C05G 5/00*    (2006.01)
*A01N 59/26*    (2006.01)
*C05B 11/04*    (2006.01)

(52) U.S. Cl.
USPC ............ 514/245; 71/29; 71/30; 71/33; 71/45; 71/48; 71/54; 71/64.1; 71/37; 424/605

(58) Field of Classification Search
None
See application file for complete search history.

(56) References Cited

U.S. PATENT DOCUMENTS

| 4,832,728 A | 5/1989 | Allan |
| 5,139,555 A | 8/1992 | Freepons |
| 5,174,804 A | 12/1992 | Rehberg |
| 5,468,715 A | 11/1995 | Joseph |
| 2005/0019363 A1 * | 1/2005 | Blount .......................... 424/405 |

FOREIGN PATENT DOCUMENTS

| CN | 1506337 A | 6/2004 |
| CN | 101050150 A | 10/2007 |
| GB | 2112765 A | 7/1983 |
| GB | 2127004 A | 4/1984 |

OTHER PUBLICATIONS

International Search Report for International Application No. PCT/IN2008/000520 mailed Apr. 24, 2009.

* cited by examiner

*Primary Examiner* — Neil Levy
(74) *Attorney, Agent, or Firm* — Alix, Yale & Ristas, LLP

(57) ABSTRACT

A composition to enhance efficiency of Photosynthesis and thereby increase agriculture/horticulture yield, containing approximately 5% to 90% Melamine, approximately 10% to 80% Ortho Phosphoric acid, approximately 8% POTASSIUM HYDROXIDE, approximately 8% Sodium Hydroxide, and up to approximately 30% POTASSIUM SULPHATE, with approximately 5% of 0.5% DIETHYL AMINOETHYL HEXANOTE, approximately 10% ZINC SULPHATE MONOHYDRATE, approximately 8% to 15% Octoborate with IGSURF 6000, and approximately 5% to 10% wetting agent to get a product for boosting Photosynthesis in liquid, soluble powder, and/or granule form.

2 Claims, 6 Drawing Sheets

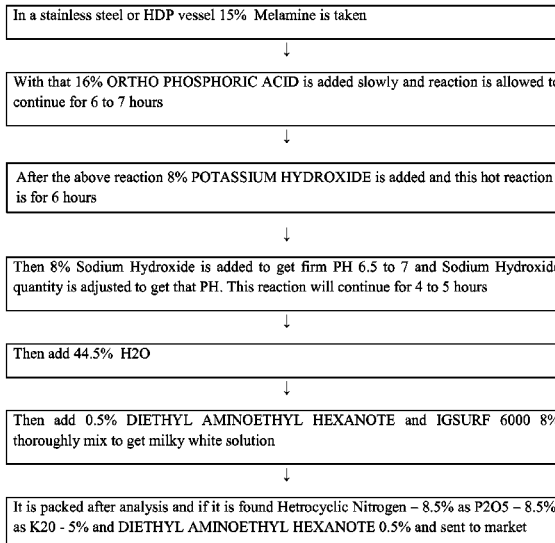

Figure 1

| In a stainless steel or HDP vessel 15% Melamine is taken |
|---|

↓

| With that 16% ORTHO PHOSPHORIC ACID is added slowly and reaction is allowed to continue for 6 to 7 hours |
|---|

↓

| After the above reaction 8% POTASSIUM HYDROXIDE is added and this hot reaction is for 6 hours |
|---|

↓

| Then 8% Sodium Hydroxide is added to get firm PH 6.5 to 7 and Sodium Hydroxide quantity is adjusted to get that PH. This reaction will continue for 4 to 5 hours |
|---|

↓

| Then add 44.5% H2O |
|---|

↓

| Then add 0.5% DIETHYL AMINOETHYL HEXANOTE and IGSURF 6000 8% thoroughly mix to get milky white solution |
|---|

↓

| It is packed after analysis and if it is found Hetrocyclic Nitrogen – 8.5% as P2O5 – 8.5%, as K20 - 5% and DIETHYL AMINOETHYL HEXANOTE 0.5% and sent to market |
|---|

Figure 2

| Melamine 127% and ORTHO PHOSPHORIC ACID 98 % mixed slowly and a sticky mass will be available |
|---|

↓

| Centrifuging the above product Melamine Phosphate as powder is obtained |
|---|

↓

| 50% Melamine Phosphate powder is taken in a ball mill with that 30% POTASSIUM SULPHATE is added and mixed |
|---|

↓

| Then Octoborate 10%, DIETHYL AMINOETHYL HEXANOTE 0.5%, ZnSO4H2O 5%, wetting agent CARBOXYL METHYL CELLULOSE 5% is added and all ball milled and fine uniform powder is obtained |
|---|

↓

| Analysed for content and if it confirms to Hetrocyclic Nitrogen – 18.5% as P2O5 – 15.8% as K2O-15%, Boron – 2%, Zn – 1.65%, DIETHYL AMINOETHYL HEXANOTE – 0.5%. Packed and sent to market |
|---|

Figure 3

Bentonite clay taken 77.5% in a rotary drum attached to granulating automatic machine alongwith 2% calcium silicate and filled

Rosin 3% is loaded in rosin cup.

Melamine 127% and ORTHO PHOSPHORIC ACID 98% mixed and centrifuged and powder taken as Melamine Phosphate

Melamine Phosphate 10%, ZnSO4 5%, Octoborate 2%, DIETHYL AMINOETHYL HEXANOTE 0.5% dissolved in water and charged in spray chamber

And then sprayed over granule with high pressure pump with suitable nozzle at 50kg / pressure sq. cm and rotated for 10 minutes

Once the granule is fully impregnated it is taken out on signal from automatic machine

Analysed and if it is found 3.75% Hetrocyclic Nitrogen, 3.13% P2O5, 1.65% Zn, 0.4% boron and 0.5% DIETHYL AMINOETHYL HEXANOTE then packed and sent to market.

Figure 4

| Melamine 40% is taken and loaded in blender and rotated |
|---|

| 10% of Mono Ammonium Phosphate is added in the blender and mixed thoroughly |
|---|

| 10 % Potassium Sulphate or Potassium Chloride is added and blended to perfect mixing |
|---|

| 10 % of soluble Boron, 5% of Zinc Sulphate, 5 % of Anhydrous Magnesium Sulphate are added in dry condition and blended |
|---|

| 13% of Sea Weed Extract and 7% of Wetting and Dispersing Agent added in blender and rotated till satisfactory homogenous product id obtained |
|---|

| Sample is drawn, analysed and if confirmed to specification packed and sent to market. |
|---|

Figure 5

| 10 % of Clay and 5 % of Silica are blended in blender and rotated and mixed |
|---|

| 30% of Melamine added in blender and thoroughly blended |
|---|

| 30 % of Humic Acid, 15 % of Potassium Chloride and 5 % of Rock Phosphate is added and blender rotated till satisfactory product obtained |
|---|

| 5% of wetting and dispensing agent is added finally and blended to fine perfection |
|---|

| Sample drawn and analysed and if confirms to specification sent to market |
|---|

Figure 6

| 15% Silica is added in the blender |
|---|

| 15 % of Melamine added in the blender and rotated |
|---|

| 25 % of Humic Acid, 10 % of Potassium Chloride, 20 % of Soluble Boron, 8 % of Water dispersible Sulphur or Ammonium sulphate is added and blender operated |
|---|

| 5 % of Water dispersible agent added and mixed thoroughly in blender up to securing homogenous product |
|---|

| 2-4-D and Naphthyl Acetic Acid is finely and finely blended each 1 % |
|---|

| Sample drawn analysed and if found good sent to market |
|---|

PRODUCT TO BOOST PHOTOSYNTHESIS

FIELD OF INVENTION

Although Photosynthesis has interested mankind of eons, rapid progress in understanding the Process has come in the last few years. It is observed Photosynthesis is relatively inefficient. In a typical growing season only 1 to 2% of the solar energy falling on the field is recovered as new Photosynthetic products. This invention is directed to increase the efficiency of Photosynthesis to increase yield. One attempt is "Foliar" application as disclosed by this invention.

Wherein the product as brought out by the invention when sprayed is absorbed in plant foliage, stem and all parts in just about 4 hours.

It is well known in the prior art that dissolving "Melamine" with principle ingredients Synonyms—Triazine, Cyanuramide, Cyanuric Triamide, Cyanurotriamide, Cyanurotiamine etc is impossible. In the present invention Melamine containing Heterocyclic Nitrogen is combined with phosphorous which is adequately enriched with Potassium Sulphate, Octoborate, Mono Zinc Sulphate with Diethyl Aminoethyl Hexanote to enhance Photosynthesis by 1.5% to 2%. Thus the present invention results in increased meristem activity increased Photosynthesis and increased yield. In this reaction Diethyl Aminoethyl Hexanote exerts synergism in this composition. This present invention would increase yield up to 15% to 20%.

BACKGROUND ART

To increase the yield in agriculture/horticulture is engaging our attention. The population increase in the world is threatening mankind and thereby the inadequate food security because of dwindling world food stock. Rightly the area Photosynthesis attracted attention worldwide because Photosynthesis is fulcrum for Life on this Earth. A molecule with 66% Heterocyclic Nitrogen in a peculiar molecular configuration i.e 3N outside and 3N imbedded. It is practically insoluble in anything and used mainly as plasticizers, as melamine crockeries and resins.

The invention brings out a process of dissolving Melamine with Ortho Phosphoric Acid together with Diethyl Aminoethyl Hexanote, Zinc Sulphate Mono Hydrate, Octo Borate, Potassium Hydroxide or Potassium Sulphate and carboxyl methyl cellulose and IGSURF 6000 emulsifier. The resultant product increases Photosynthesis by 1.5% to 2% and yield up to 15% to 20%.

The application of Melamine to increase Photosynthesis is not known in the prior art. The invention brings out a liquid, soluble powder and granule form of product.

The process brought by the invention takes into account "Fixation" and soil solubility and avoids fixation, wastage, drain off etc. and brings out a method to use all ingredients judiciously reducing dependence on bulk soil application.

FIG. 1 is a flowchart of a method of making an embodiment of the disclosed product, described as Example 1.

FIG. 2 is a flowchart of a method of making another embodiment of the disclosed product, described as Example 2.

FIG. 3 is a flowchart of a method of making another embodiment of the disclosed product, described as Example 3.

FIG. 4 is a flowchart of a method of making another embodiment of the disclosed product, described as Example 4.

FIG. 5 is a flowchart of a method of making another embodiment of the disclosed product, described as Example 5.

FIG. 6 is a flowchart of a method of making another embodiment of the disclosed product, described as Example 6.

DETAILED DESCRIPTION OF THE INVENTION

The backgrounds need, parameters required are carefully codified and the invention proceeded.

Heterocyclic Nitrogen 8.5% to get from 15% Melamine, to get 8.5% as P205 from ORTHO PHOSPHORIC ACID 16% and to get 5% as POTASSIUM OXIDE from 8% POTASSIUM HYDROXIDE taken Sodium Hydroxide 8% to neutralize. Orthophosphoric acid gave 8.5% as P205 in addition to dissolving Melamine. This soluble liquid is a viscous dull white liquid and at 0.1% to 0.2% concentration sprayed as "Foliar" does the miracle by enhancing Photosynthesis by 1.5% to 2% and increasing flowering, yield, and quality.

The preparation is made by taking Melamine 15% and 16% ORTHO PHOSPHORIC ACID is added slowly, stirring. Since reaction is slow it will take 5 to 6 hours to complete. Then add POTASSIUM HYDROXIDE 8% cautiously and since the reaction is violent and emitting Hydrogen etc it has to be performed carefully. After the reaction is completed i.e. after 3 or 4 hours adding Sodium Hydroxide at 8% (quantity till neutral PH 7 is obtained) and this reaction is more violent than (POTASSIUM HYDROXIDE reaction) and care should be taken. After everything is over adding 44.5% De-Mineralized water finally adding 0.5% DIETHYL AMINOETHYL HEXANOTE the product is complete after 8% Emulsifier—IGSURF-6000 is added and stirred vigorously.

In another preparation one mole of Melamine and one mole of ORTHO PHOSPHORIC ACID are added and thoroughly mixed to get Melamine Phosphate. Any quantity can be made but this proportion followed. Completely centrifuged and powder taken as C3H9N6PO4 (Melamine Phosphate). Melamine Phosphate—50%, POTASSIUM SULPHATE—30%, ZINC SULPHATE MONO HYDRATE—5%, wetting agent—5%, Octoborate—9.5% and DIETHYL AMINOETHYL HEXANOTE—0.5% all added and machine mixed in ball mill and blended.

77.5% roasted or unroasted bentonite clay granule is charged in the drum mixer with calcium silicate 2% of the automatic granulating machine. Rosin 2.5 to 3% is provided in the Rosin Recepticle, once the machine is on rosin will melt and uniformly coat the granule. In the spray chamber 10% Melamine Phosphate, 5% Zinc Sulphate Mono Hydrate, 2% Octoborate, 0.5% DIETHYL AMINOETHYL HEXANOTE are added after dissolving in water and with wetting agent (Quantum Sufficientum). When the machine is on with suitable nozzle the composition is sprayed at 50 kg/pressure per sq.cm. After all is over the drum is rotated for 15 minutes and the granule is released.

In another preparation 30% to 40% Melamine, 10% Mono Ammonium Phosphate, 10% Potassium Sulphate or Potassium Chloride, 10 to 20% Soluble Boron, 7% Wetting and Dispensing Agent, 13% Sea Weed Extract or Humic Acid, 5% Zinc Sulphate mono Hydrate and 5% Anhydrous Magnesium Sulphate are blended to obtain homogenous flowable powder.

In yet another preparation 30% Melamine, 30% Humic Acid, 10% Clay, 5% Precipitated Silica, 5% Wetting and Dispensing Agent, 15% Potassium Chloride, and 5% Rock Phosphate are individually grinded and mechanically blended to get homogenized sand and clay carrying complex suitable for soil application in various crops.

In yet another preparation 15% Melamine, 15% Precipitated Silica, 25% Humic Acid, 10% Potassium Chloride, 20% Octoborate, 8% Sulphur or Ammonium Sulphate, 5% Water dispersible and Wetting Agent, 1% Dichlorophenoxy acetic acid and 1% Naphthyl Acetic Acid are grinded and added with Precipitated Silica and blended to obtain homogenous product suitable for oil palms.

The foregoing objects of the present invention are illustrated in the following examples.

EXAMPLES

Example 1

Melamine Complex—SL

Ingredients and Composition:

| | |
|---|---|
| Melamine | 15% |
| Ortho Phosphoric Acid | 16% |
| Potassium Hydroxide | 8% |
| Sodium Hydroxide | 8% |
| IGSURF 6000 | 8% |
| De Mineralised Water | 44.5% |
| Diethyl Aminoethyl Hexanote | 0.5% |

Melamine 15% is taken in a glass or heat tolerable and acid resistant container. Then 16% ORTHO PHOSPHORIC ACID slowly added simultaneously stirring. Care should be taken since heat will evolve. Reaction will take 6 to 7 hours to dissolve and then 8% POTASSIUM HYDROXIDE is added very slowly. Enormous heat will evolve and gas will also escape (Hydrogen & Oxygen). This reaction will take 5 to 6 hours. After that 8% Sodium Hydroxide is added and will produce violent reaction, noise, gas etc and the reaction will take 4 hours. After that PH is tested and it should be 6.5 to 7 PH. Accordingly Sodium Hydroxide quantity is decided (Approx—8%)

Then finally 0.5% DIETHYL AMINOETHYL HEXANOTE is added and 44.5% water is added along with special emulsifier 8% IGSURF—6000. Now 100% soluble liquid is ready.

A method of preparing the above-described product is shown in the flowchart of FIG. 1.

Example 2

Melamine Complex—SP

Ingredients and Composition:

| | | |
|---|---|---|
| Melamine | 127% } | will yield 225% |
| Ortho Phosphoric Acid | 98% } | Melamine Phosphate |
| (Sticky ball should be centrifuged and Melamine Phosphate taken as dry clean powder). | | |
| Melamine Phosphate | 50% | |
| Potassium Sulphate | 30% | |
| Octoborate | 9.5% | |
| Zinc Sulphate Mono Hydrate | 5% | |
| Wetting agent | 5% | |
| (Carboxyl Methyl Cellulose Like) | | |
| Diethyl Aminoethyl Hexanote | 0.55% | |

Melamine Phosphate 50% is taken and all ingredients are added and it is ball milled and blended in mechanized blender.

A method of preparing the above-described product is shown in the flowchart of FIG. 2.

Example 3

Melamine Complex—GR

| | |
|---|---|
| Bentonite roasted or unroasted clay } or Silica quartz } | 77.5% + 2% calcium silicate (both 79.5%) |
| Melamine Phosphate | 10% |
| Zinc Sulphate Mono Hydrate | 5% |
| Octoborate | 2% |
| Diethyl Aminoethyl Hexanote | 0.5% |
| Rosin | 3% |

(a) Preweighted granule is charged in drum mixer with calcium silicate.
(b) Then ingredients Melamine Phosphate, Zinc Sulphate, borate and DIETHYL AMINOETHYL HEXANOTE with wetting agent mixed in water and poured in the spray chamber.
(c) Then the mixture in spray chamber sprayed over granules in drum with suitable nozzle at 50 kg/pressure sq.cm and rotating the drum.
(d) Rosin is mixed during the process from its recepticle after melting.
(e) Contents mixed well for 15 minutes in the drum.
(f) Everything is done by an elaborate granulating automatic machine.
(g) The product is discharged after signal from the machine.

A method of preparing the above-described product is shown in the flowchart of FIG. 3.

Example 4

Melamine Complex—SP II

Ingredients and Composition:

| | |
|---|---|
| Melamine | 30 to 40% |
| Mono Ammonium Phosphate | 10% |
| Potassium Sulphate/Potassium Chloride | 10% |
| Soluble Boron | 10 to 20% |
| Sea Weed Extract | 13% |
| Wetting and Dispensing Agent | 7 kg |
| Zinc Sulphate Mono Hydrate | 5% |
| Anhydrous Magnesium Sulphate | 5% |

Individually the ingredients are pulverized and measured quantity is blended in a mechanical blender to get homogenous fine meshed powder.

A method of preparing the above-described product is shown in the flowchart of FIG. 4.

Example 5

Melamine Complex Soil Application

This Melamine complex suitably designed for soil application in various crops. Since the need is felt, we have designed a perfect configuration for soil application.

Ingredients and Composition:

| | |
|---|---|
| Melamine | 30% |
| Humic Acid | 30% |
| Clay | 10% |
| Silica | 5% |
| Wetting and dispensing agent | 5% |
| Potassium Chloride | 15% |
| Rock Phosphate | 5% |

All the ingredients are individually grinded and blended mechanically to get homogenized sand and clay carrying complex.

A method of preparing the above-described product is shown in the flowchart of FIG. 5.

Example 6

Melamine Complex for Oil Palms

Oil Palm is an important crop in Malaysia, Indonesia and Far East countries.

A study was undertaken to understand the requirement of Oil Palm. With plenty of rainfall, the crop is extremely coming up well in these localities. But deficiency of some minerals is noticed. Accordingly, an unique formula is designed which is given below.

Ingredients and Composition:

| | |
|---|---|
| Melamine | 15% |
| Silica | 15% |
| Humic acid | 25% |
| Potassium Chloride | 10% |
| Soluble Boron | 20% |
| Sulphur Water dispersable granule Or Ammonium Sulphate | 8% |
| Water dispersible and wetting agent | 5% |
| 2-4-D | 1% |
| Naphthyl Acetic Acid | 1% |

All the ingredients except Silica grinded individually and added with Silica and blended to get the homogenous product.

A method of preparing the above-described product is shown in the flowchart of FIG. 6.

The above examples provide illustrative representations of the effectiveness of some preferred compositions within the scope of the present invention. The above examples are not intended to limit the scope of the claims set forth herein. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

SUMMARY OF THE INVENTION

Thus according to the basic aspect of the present invention there is provided a product to boost Photosynthesis and yield in Agriculture and Horticulture crops comprising Melamine.

A further object of the present invention is to provide a process of preparing the product to boost Photosynthesis and yield in Agriculture and Horticulture crops comprising Melamine in soluble liquid form comprising essentially of:

a. Melamine up to 15%;
b. Ortho Phosphoric Acid up to 16%;
c. Potassium Hydroxide up to 8%;
d. Sodium Hydroxide up to 8%;
e. IGSURF 6000 up to 8%;
f. Demineralised water up to 44.5% and
g. Diethyl Aminoethyl Hexanote up to 0.5%;

Wherein the process of preparing the said product in soluble liquid form comprising the steps of:

a. Mixing Melamine with Ortho Phosphoric Acid in a hard glass or stainless
b. steel or heat resistant high density poly vessel and continuing the reaction for 6-7 hours;
h. Adding Potassium Hydroxide to the said reaction and continuing the said reaction for 5-6 hours;
i. Adding Sodium Hydroxide and continuing the said reaction for 4-5 hours;
j. Measuring the pH of the said reaction, wherein the said pH should lie in the range of 6.5 or 7 and accordingly adjusting the said Sodium Hydroxide quantity;
k. Adding De-mineralized water and stirring vigorously;
l. Adding IGSURF-6000 special emulsifier to homogenize the mixture; and
m. Adding Diethyl Aminoethyl Hexanote It is another object of the present invention to provide a product to boost Photosynthesis and yield in Agriculture and Horticulture crops comprising Melamine in homogenous powder form comprising essentially of:

a. Melamine Phosphate up to 50%;
b. Potassium Sulphate up to 30%;
c. Octoborate up to 9.5%;
d. Zinc Sulphate Mono Hydrate up to 5%;
e. Diethyl Aminoethyl Hexanote up to 0.5%; and
f. Water dispersible cum Wetting Agent up to 5%;

Wherein the process of preparing the said product in homogenous powder form comprising the steps of mixing Melamine Phosphate along with Potassium Sulphate, Octoborate, Zinc Sulphate Mono Hydrate, Diethyl Aminoethyl Hexanote and water dispersible cum wetting agent in a Ball Mill or ribbon blender.

It is another object of the present invention to provide a product to boost Photosynthesis and yield in Agriculture and Horticulture crops comprising Melamine in granule form comprising essentially of:

a. Bentonite roasted or unroasted clay granule or Silica Quartz up to 77.5%;
b. Calcium Silicate up to 2%;
c. Rosin up to 3%;
d. Melamine Phosphate up to 10%;
e. Zinc Sulphate Mono Hydrate up to 5%;
f. Octoborate up to 2%; and
g. Diethyl Aminoethyl Hexanote up to 0.5%.

Wherein the process of preparing the said product in granule form comprising the steps of:

a. Charging Bentonite clay granule roasted or unroasted in the drum mixer with Calcium Silicate of an automatic granulating machine;
b. Mixing Melamine Phosphate along with Zinc Sulphate Mono Hydrate, Octoborate, Diethyl Aminoethyl Hexanote with Calcium Silicate mixed in water in the spray chamber;
c. Spraying the said mixture over granules in with suitable nozzle at 50 kg/pressure sq.cm and rotating the said drum;
d. Mixing Rosin during the process from its recepticle after melting; and
e. Mixing the contents well for 15 minutes in the said drum mixer.

It is yet another object of the present invention to provide a product to boost Photosynthesis and yield in Agriculture and Horticulture crops comprising Melamine in homogenous flowable powder comprising essentially a blended of:
a. Melamine up to 30 to 40%;
b. Mono Ammonium Phosphate 10%;
c. Potassium Sulphate or Chloride up to 10%;
d. Octoborate 10 to 20%;
e. Sea Weed Extract or Humic Acid up to 13%;
f. Zinc sulphate Mono Hydrate 5%;
g. Anhydrous Magnesium Sulphate up to 5%; and
h. Water dispersible cum wetting agent up to 7%.

It is yet another object of the present invention to provide a product to boost Photosynthesis and yield in Agriculture and Horticulture crops comprising Melamine in homogenous flowable powder suitable for soil application in various crops comprising essentially a blended of:
a. Melamine up to 30%;
b. Humic Acid up to 30%;
c. Clay up to 10%;
d. Precipitated silica up to 5%;
e. Wetting and dispensing agent up to 5%;
f. Potassium Chloride up to 15%; and
g. Rock Phosphate up to 5%.

It is another object of the present invention to provide a product to boost Photosynthesis and yield in Agriculture and Horticulture crops comprising Melamine in homogenous powder form suitable for oil palms comprising essentially a blended of:
a. Melamine up to 15%;
b. Precipitated Silica up to 15%;
c. Humic acid up to 25%;
d. Potassium Chloride up to 10%;
e. Octoborate up to 20%;
f. Sulphur or Ammonium Sulphate up to 8%;
g. Water dispersible wetting agent up to 5%
h. Dichlorophenoxy acetic acid up to 1%; and
i. Naphthyl Acetic Acid up to 1%.

The invention claimed is:

1. A product for boosting photosynthesis and yield in agriculture and horticulture crops being in a soluble liquid form comprising, by weight:
   a. Melamine present up to 15%;
   b. Ortho Phosphoric Acid present up to 16%;
   c. Potassium Hydroxide present up to 8%;
   d. Sodium Hydroxide present up to 8%;
   e. alkylaryl sulfonate (IGSURF 6000) present up to 8%;
   f. Demineralised water present up to 44.5%; and
   g. Diethyl Aminoethyl Hexanote present up to 0.5%.

2. A process for preparing the product of claim 1 comprising the steps of:
   a. reacting Melamine with Ortho Phosphoric Acid in a hard glass, stainless steel or heat resistant high density poly vessel for approximately 6-7 hours;
   b. adding Potassium Hydroxide to the said reaction of Melamine and Ortho Phosphoric Acid and continuing the said reaction for 5-6 hours;
   c. adding Sodium Hydroxide to the reaction of Melamine, Ortho Phosphoric Acid and Potassium Hydroxide and continuing the said reaction for 4-5 hours;
   d. measuring the pH of the reaction;
   e. if necessary, adjusting the pH to within the range of approximately 6.5-7 by adding Sodium Hydroxide;
   f. adding de-mineralized water and stirring vigorously;
   g. adding IGSURF-6000 special emulsifier to homogenize the mixture; and
   h. adding Diethyl Aminoethyl Hexanote.

* * * * *